July 7, 1959     D. K. BADERTSCHER     2,893,361
ENGINE SHROUD
Filed April 15, 1957     3 Sheets-Sheet 2
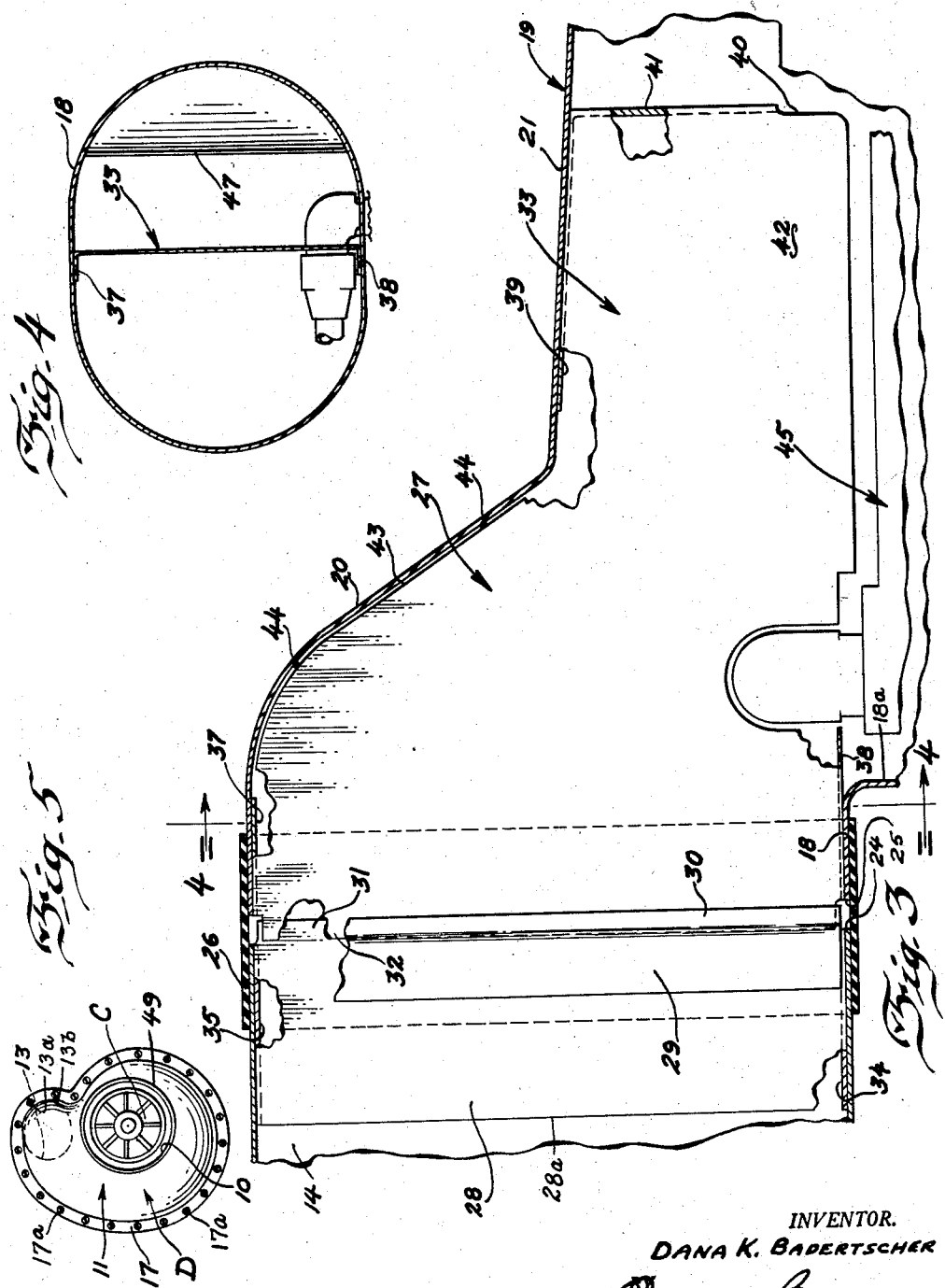
INVENTOR.
DANA K. BADERTSCHER
Carl J. Barbee
ATTORNEY July 7, 1959  D. K. BADERTSCHER  2,893,361
ENGINE SHROUD Filed April 15, 1957  3 Sheets-Sheet 3

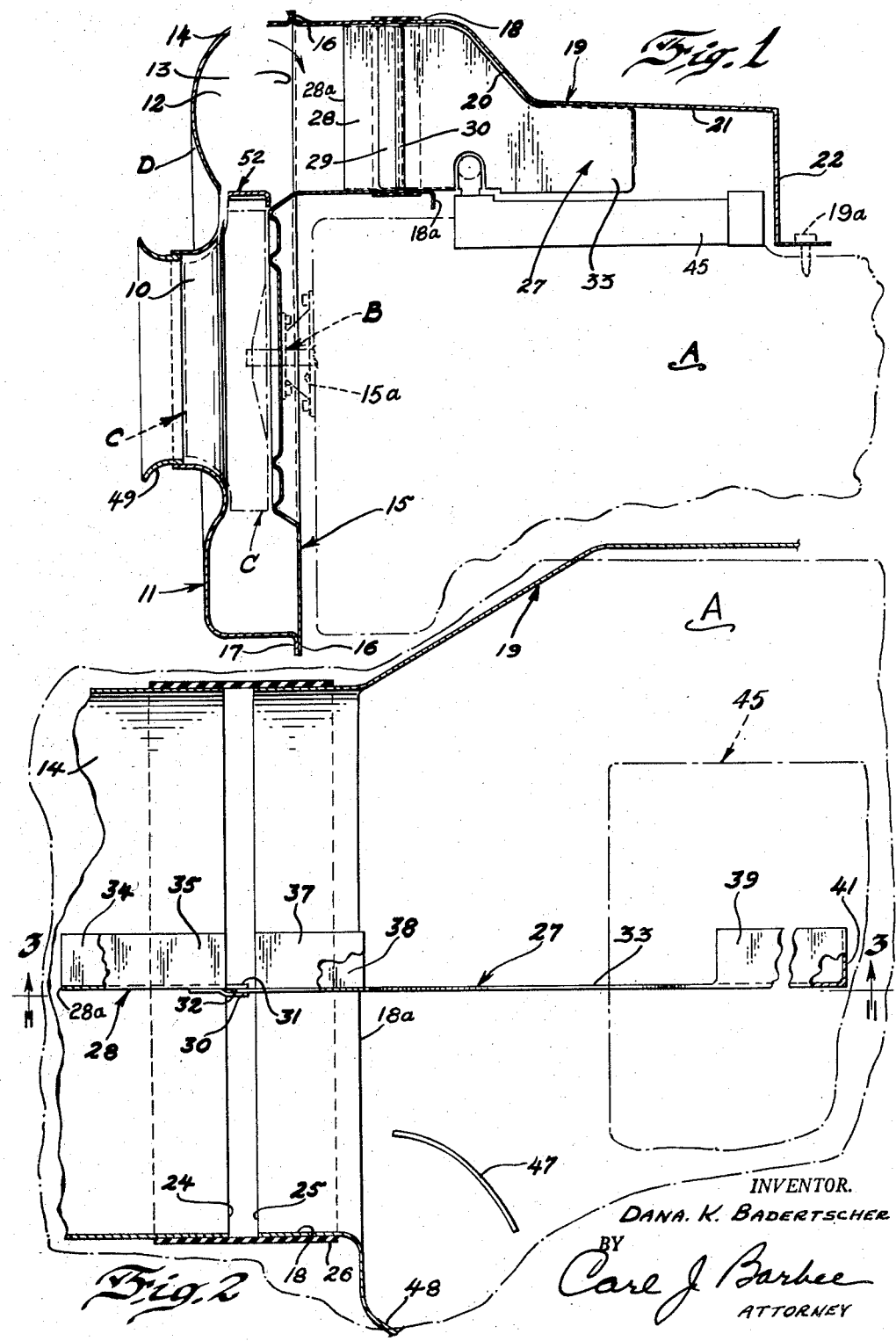

INVENTOR.
DANA K. BADERTSCHER
BY
Carl J. Barbee
ATTORNEY

United States Patent Office 2,893,361
Patented July 7, 1959

2,893,361
ENGINE SHROUD

Dana K. Badertscher, Grosse Pointe Park, Mich., assignor to American Motors Corporation, Kenosha, Wis., a corporation of Maryland Application April 15, 1957, Serial No. 652,846

5 Claims. (Cl. 123—41.6)

The invention relates to air cooled type internal combustion engines and has particular reference to the shrouding of the engine for air distribution purposes in effecting engine cooling.

The general object of the invention is to provide an arrangement of sheet material stampings or moldings for providing the enclosed shroud structure necessary for effecting engine cooling.

A specific object relates to the joining of the forward section of the shroud to the rearward section and providing necessary baffling structure in association with both shroud sections.

Another specific object is to provide a relatively simple and inexpensive construction for joining the front and rear sections of the shroud structure in conjunction with the joining of the respective sections of the baffle member.

A further object is to provide in a shroud structure a blower housing having means for reducing turbulence at the outlet thereof, such means also serving to prevent re-circulating air beyond the point at which such air should normally leave the blower housing.

A still further object is to provide in a shroud structure a blower housing having an extension at the inlet thereof which serves to increase the efficiency of the blower by increasing the effective area of the air entry opening—the cross-sectional area of the entrance throat remaining unchanged.

Other objects and advantages of the invention will be apparent from the ensuing specification and appended drawings in which:

Figure 1 is a side elevational sectional view of the principal portions of the engine shroud shown mounted over a typical engine, the engine being shown schematically;

Figure 2 is an enlarged fragmentary plan view of the apparatus of Figure 1 except that the outer walls of the shroud sections are broken in section to reveal the baffle structure therebeneath;

Figure 3 is a fragmentary sectional view generally similar to Figure 1 and taken on line 3—3 of Figure 2 but enlarged as compared to Figure 1 and disclosing the detailed construction;

Figure 4 is a fragmentary view taken on the line 4—4 of Figure 3;

Figure 5 is a front view of the shroud shown on a considerably smaller scale than the other views;

Figure 6:
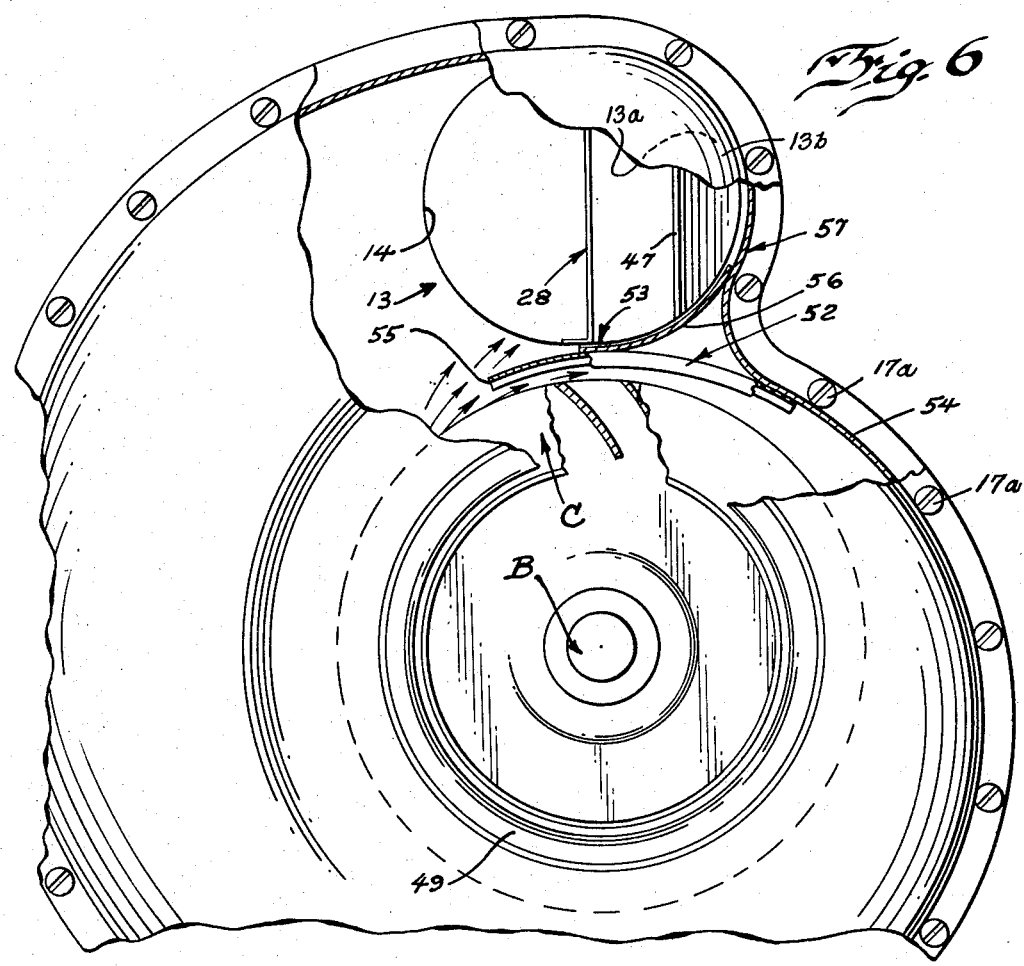
Figure 6 is a fragmentary detail view, partly in section, of the blower housing and associated parts taken from the entrance end of such housing.

Referring to Figure 1, there is shown schematically a typical engine A of the air cooled type wherein the shaft B drives a blower C which is mounted within the entrance opening of the engine shroud section D which distributes the air about the exterior surface of the engine as needed for cooling same to the desired operating temperature.

The blower is of the centrifugal type and draws the atmospheric air into the entrance opening 10 of the stamping or molding 11 which forms the forward portion of the shroud section D. This stamping or molding provides a suitable air chamber 12 which may be somewhat scroll shaped as best viewed in Figure 5 and has an outlet opening 13 which registers with the duct portion 14 which is formed in the stamping or molding 15. This latter stamping or molding serves as the rear wall of the blower housing so that all air passing through the blower housing is directed through the duct 14. The housing wall 15 is provided with an outwardly flared circumferential flange 16 having the same general configuration as the outwardly extending mating flange 17 on the forward stamping or molding 11. The two stampings or moldings may be secured together at their flanges as by means of bolts 17a. The outwardly protruding duct portion 14 is generally axially aligned with the entrance duct portion 18 of the rearwardly directed shroud section 19.

The rearward shroud section has an angularly downwardly directed wall 20 commencing adjacent the inlet duct 18 and terminating with an elongated generally horizontal wall 21. The downwardly directed wall 20 and the downwardly depending rear wall 22 directs the air flow downwardly onto the engine. It will be understood that commencing at the terminus 18a of the duct portion 18 and extending to the rear wall 22 the shroud 19 is open at its underside. Additional shrouding (not shown) which forms no part of the invention, encloses a substantial portion of the sides of the engine as well as the front and rear walls thereof and it will be understood that the rear shroud section as shown in Figure 1 is incomplete with reference to the lower skirt portions thereof.

The free end 24 of discharge duct 14 terminates short of the free end 25 of the entrance duct 18 and a resilient collar 26 made of rubber or some similar material is stretched over the adjacent ends of said duct ends to prevent the escape of air at the juncture thereof. It will be understood that the wall 15 is secured to a forward portion of the engine by any suitable fastening means 15a and the rearward section 19 is likewise secured in some manner to the engine by any suitable fastening means 19a.

A baffle assembly identified generally by the numeral 27 serves to divide the air stream entering the duct 18 and to a minor extent also serves to lend support to the shroud sections in the region of the duct 14 and the duct 18. When the air is discharged from the blower it is traveling generally in a path which is circumferentially of the blower, as indicated by the arrows in Fig. 6. When the air reaches the area identified by the numeral 13a and defined by the curved wall 13b, the direction of flow is immediately changed and the air commences traveling in a direction generally axially of the duct members 14 and 18. However, since the air strikes the curved wall 13b under comparatively high velocity, a pressurizing condition is set up and the tendency apparently is for an excessive amount of air to be deflected toward the left side of the duct 14 (viewing Fig. 6). However, the positioning of the leading edge 28a of the baffle section 28 is such with reference to the area 13a that the desired distribution of air on either side of the baffle assembly 27 is assured. Since the engine is of the air cooled type and since there would be one bank of cylinders on one side of the engine and another bank on the opposite side (these details of the engine not being shown) it is desirable to distribute the cooling air substantially equally to each bank of cylinders. The baffle assembly 27 assures the appropriate distribution of the air flow to each side of the engine.

The baffle section 28 has a strip 29 secured thereto with an outwardly flared lip 30 which is spaced from the inner face 31 of the forward margin of baffle member 28 thereby providing an elongated pocket extending throughout the height of the baffle section for receiving the forward marginal edge 32 of the rear baffle section 33 in a tongue and groove manner when the assembled stampings 11 and 15 are mounted relative to the rear shroud section 19.

It will be understood that as the tongue portion of the rear baffle section is inserted into the accommodating groove in the forward baffle section, that general axial alignment of duct 14 and duct 18 is effected. The forward baffle section 28 is provided with laterally projecting anchoring flanges 34 and 35 which are secured to the internal wall of duct 14 for anchoring the baffle section in its predetermined generally vertical position. The rear baffle section 27 is likewise provided with laterally projecting upper and lower flanges 37 and 38 for firmly anchoring the baffle section in a predetermined generally vertical position so as to lie in a plane common to the plane of baffle section 28. At the rearward end of baffle section 27 a laterally projecting flange 39 is secured to the inner wall of shroud section 19 and the rear wall 40 of the baffle section is provided with a laterally projecting strengthening flange 41 for providing support and stability to the otherwise unsupported lower corner portion 42 of the baffle section.

The marginal edge 43 of the baffle section 27, which is not provided with a laterally projecting attaching flange, may be anchored to the inner face of the inclined shroud wall 20 as by means of spot welding at one or more locations 44. Thus, the rear baffle section is firmly secured along its entire upper marginal edge to the rear shroud section 19.

Viewing Figure 2, it will be noted that the shroud walls are shown in section whereas the baffle sections 27 and 28 are shown in full lines as they would appear directly beneath the upper inner walls of the shroud sections 14 and 19. Directly beneath the baffle section 33 and mounted on top of the engine is a heat radiating core 45 through which the oil in the lubrication system travels, the core being exposed in the path of the cooling air and the temperature of such lubrication oil is thus lowered as desired to a suitable operating temperature.

On one side of the baffle assembly an additional baffle 47 is provided and serves to divert some of the air stream toward the side wall 48 for more uniform cooling of the bank of cylinders situated on that side of the engine. As in the case of baffle sections 27 and 28, the baffle 47 is shown in full lines as it would appear directly beneath the upper inner wall of the shroud section 19. The location of the baffle 47 and the curved contour thereof are important for obtaining proper function.

Figure 7:
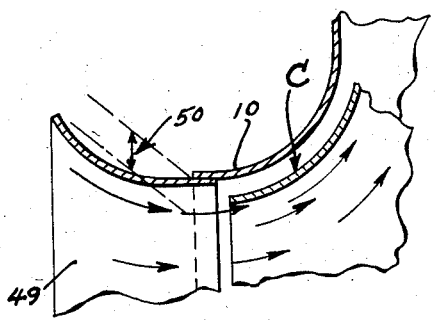
Figure 7 is a fragmentary sectional detail view of the air entry portion of the blower housing, including a portion of the blower and illustrating the effective air entry area.
Figure 8:
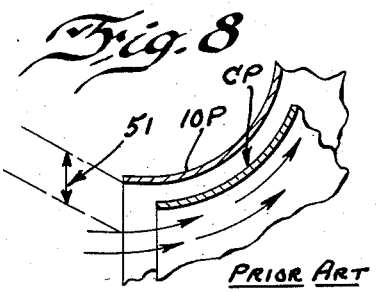
Figure 8 is a fragmentary detail sectional view of a prior art form of air entry throat and illustrating the effective air entry area of such a throat.

Referring to Figures 1, 6 and 7 it will be noted that an annular extension 49 is mounted in the outer end of the entrance throat 10 of the blower housing, such extension flaring outwardly in progressively increasing diametric dimension. The internal contour of the extension in combination with the internal contour of the housing throat simulates a venturi and increases the efficiency of the blower inasmuch as it produces, in effect, a larger air entry area than would be the case if the extension were omitted. The arrows in Figures 7 and 8 illustrate the relative approximate diametric extents of the air entry areas of my device and a prior art device in which the extension is omitted. The ineffective area in the device of Figure 7 is indicated by the dimension identified by the numeral 50 and the ineffective area in the device of Figure 8 is indicated by the dimension identified by the numeral 51. In the prior art device the air entry throat may be identified as 10P and the blower as CP.

Referring to Figures 1 and 6 it will be noted that a lip identified generally by the numeral 52 and channel shaped in cross section projects into the interior of the blower housing so as to overlie a portion of the circumference of the blower. Such lip is situated immediately beneath the lowermost level or floor (indicated at 53 in Figure 6) of the duct portion 14 of the rear shroud section 19 and its lengthwise arcuate contour forms in effect a continuation of the arcuate contour of the housing wall 54. As the air is discharged centrifugally by the blower, the inner end 55 of the lip will direct such air into the duct 14 with a minimum of turbulence at the duct entrance and the lip also prevents re-circulating the air past the point at which it should normally leave the blower housing. Without the lip the existence of re-circulated air would reduce volumetric efficiency and at the same time increase the temperature of the air to the engine.

A reinforcing bracket 56 is secured at one end to the lip and at its other end to the blower housing wall 57 for providing necessary support for the lip.

What is claimed is:

1. An air distribution device for an internal combustion engine comprising a blower housing having a forward wall and a rearward wall spaced from each other to provide a blower chamber, said blower housing being secured to and mounted ahead of the engine and having an air inlet opening in its forward wall, said housing including an air discharge duct secure with the rearward wall of the housing and projecting laterally outwardly therefrom and being superimposed over the engine, said air discharge duct being adapted for changing the direction of air flow as the air leaves the blower housing and travels into such laterally projecting discharge duct; an air distribution shroud secured to and positioned over the engine and rearwardly of the blower housing, said shroud being spaced from the engine and functioning to direct the air entering the shroud from the blower housing down onto the engine, said shroud including a forwardly projecting air inlet duct generally aligned with the air discharge duct of the blower housing and arranged in end to end fashion relative thereto; a connecting sleeve telescopically positioned over the adjacent duct ends to form a continuous air passage between the ducts; a baffle secured within the interior of the housing discharge duct and a second baffle secured within the interior of the air inlet duct of the shroud, said baffles being interconnected with each other and lying in a substantially common plane, such plane extending in a path generally longitudinally of the ducts, and serving to divide the air stream as the air travels through the ducts into the shroud whereby to provide substantially uniform distribution of such air to both sides of the engine.

2. An air distribution device for an internal combustion engine as set forth in claim 3 wherein the baffles when interconnected lie in a common and substantially vertical plane and wherein each baffle extends generally diametrically across the inside diameter of its respective duct.

3. An air distribution device as set forth in claim 1 wherein each baffle has laterally projecting flanges at its upper and lower margins, said flanges being anchored to the internal walls of the respective ducts.

4. An air distribution device as set forth in claim 3 wherein the end margin of one baffle has a lip extending longitudinally thereof to provide in conjunction with the end margin of the baffle a longitudinal pocket into which the end margin of the other baffle is received.

5. An air distribution device as set forth in claim 2 wherein an added baffle is positioned within the interior of the air inlet duct of the shroud but is spaced from the other baffles for directing a stream of air onto a preselected area of the engine.

References Cited in the file of this patent

UNITED STATES PATENTS

| | | |
|---|---|---|
| Re. 23,146 | Packwood | Aug. 7, 1946 |
| 1,598,867 | Lundelius | Sept. 7, 1926 |
| 1,903,979 | Cappa | Apr. 18, 1933 |
| 1,995,935 | Marks et al. | Mar. 26, 1935 |
| 2,549,482 | Kiekhaefer | Apr. 17, 1951 |
| 2,700,377 | Chesnutt | Jan. 25, 1955 |

UNITED STATES PATENT OFFICE
Certificate of Correction

Patent No. 2,893,361  July 7, 1959

Dana K. Badertscher

It is hereby certified that error appears in the printed specification of the above numbered patent requiring correction and that the said Letters Patent should read as corrected below.

In the drawings, Sheet 1, Figure 1 should appear as shown below instead of as in the patent:

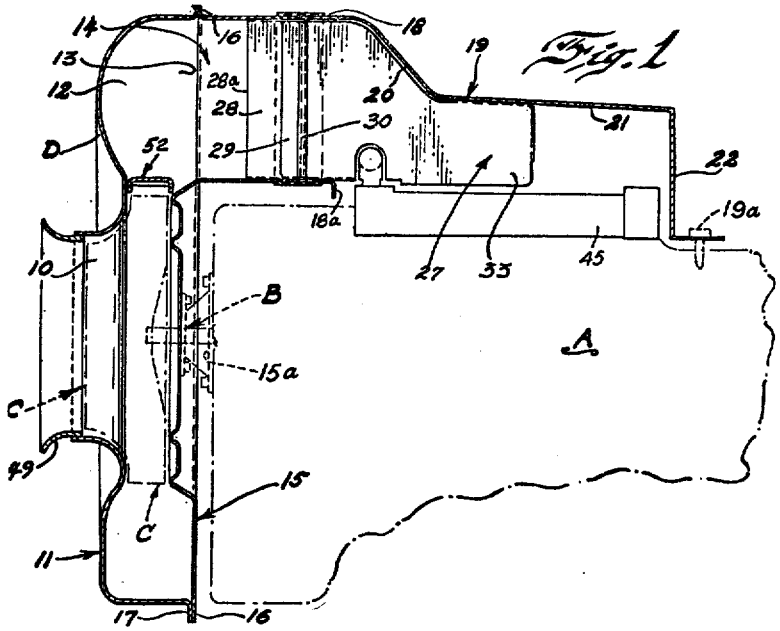

column 4, line 54, after "shroud" insert a comma; line 58, for the claim reference numeral "3" read —1—.

Signed and sealed this 19th day of January 1960.

[SEAL]

Attest:
KARL H. AXLINE,
*Attesting Officer.*

ROBERT C. WATSON,
*Commissioner of Patents.*